(12) United States Patent
Wu

(10) Patent No.: US 9,807,435 B2
(45) Date of Patent: Oct. 31, 2017

(54) VIDEO PROCESSING APPARATUS

(71) Applicants: Inventec (Pudong) Technology Corporation, Shanghai (CN); INVENTEC CORPORATION, Taipei (TW)

(72) Inventor: Xu-Xiang Wu, Shanghai (CN)

(73) Assignees: Inventec (Pudong) Technology Corporation, Shanghai (CN); INVENTEC CORPORATION, Taipei (TW)

( * ) Notice: Subject to any disclaimer, the term of this patent is extended or adjusted under 35 U.S.C. 154(b) by 65 days.

(21) Appl. No.: 14/863,431

(22) Filed: Sep. 23, 2015

(65) Prior Publication Data

US 2017/0034552 A1 Feb. 2, 2017

(30) Foreign Application Priority Data

Jul. 29, 2015 (CN) .......................... 2015 1 0454322

(51) Int. Cl.
| | |
|---|---|
| *H04N 21/24* | (2011.01) |
| *H04N 21/61* | (2011.01) |
| *H04N 21/238* | (2011.01) |
| *H04N 21/239* | (2011.01) |

(52) U.S. Cl.
CPC .......... *H04N 21/24* (2013.01); *H04N 21/238* (2013.01); *H04N 21/2393* (2013.01); *H04N 21/6125* (2013.01)

(58) Field of Classification Search
CPC .. H04N 21/24; H04N 21/222; H04N 21/2404; H04N 21/6125; H04N 21/64322; H04N 21/6473; H04N 7/17336; H04N 7/17354; H04N 21/238; H04N 21/2393
See application file for complete search history.

(56) References Cited

FOREIGN PATENT DOCUMENTS

| | | |
|---|---|---|
| TW | 201430706 A | 8/2014 |
| TW | 201501075 A | 1/2015 |

*Primary Examiner* — Chenea Smith
(74) *Attorney, Agent, or Firm* — CKC & Partners Co., Ltd.

(57) ABSTRACT

A video processing apparatus is used to be connected to a request server and a content server through working network. The video processing apparatus includes a switch board, a adapter plate, a plurality of video processing nodes and a management board. The switch board includes a master switch and a slave switch. The master switch is electrically connected to the slave switch. The adapter plate is electrically connected to the switch board. The adapter plate includes a plurality of automatic cluster management units. The video processing nodes are electrically connected to the automatic cluster management units. The management board is electrically connected to the adapter plate, and monitoring working statue signals of the plurality of video processing nodes via the adapter plate.

11 Claims, 3 Drawing Sheets

VIDEO PROCESSING APPARATUS

RELATED APPLICATIONS

This application claims priority to Chinese Application Serial Number 201510454322.8, filed Jul. 29, 2015, which is herein incorporated by reference.

BACKGROUND

Field of Invention

The present disclosure relates to an electronic apparatus. Mare particularly, the present disclosure relates to a video processing apparatus.

Description of Related Art

The advance of internet technology comes with the increasing demand of video contents, so that the requirement to a video processing apparatus is also increased with aforesaid demand. Nevertheless, the requirement to the computing ability of a video processing apparatus is also increased, along with the uprising power consumption of a video processing apparatus. In order to decrease the power consumption of a video processing server, to improve the integrated intensity of a video processing server, and to increase capability of a video processing server to synchronized multi-processing video signals a video processing apparatus with highly-integrated intensity becomes more and more important nowadays, such as highly-integrated intensity video processing apparatus with ARM (Acorn RISC Machine)-based architecture. On the other hand, a highly-integrated video processing apparatus usually has lower performance to watt ratio. In consequence, the available structure of video processing apparatus, as described above, apparently exists inconvenience and defect, which would need further improvement. To deal with aforesaid problem, practitioners of ordinary skill in the art have striven to attain a solution, still lacks a suitable solution to be developed. Therefore, to deal with aforesaid problem effectively is an important subject of research and development, and also a desired improvement in the art.

SUMMARY

The present disclosure provides a memory-based substrate.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION

Figure 1:
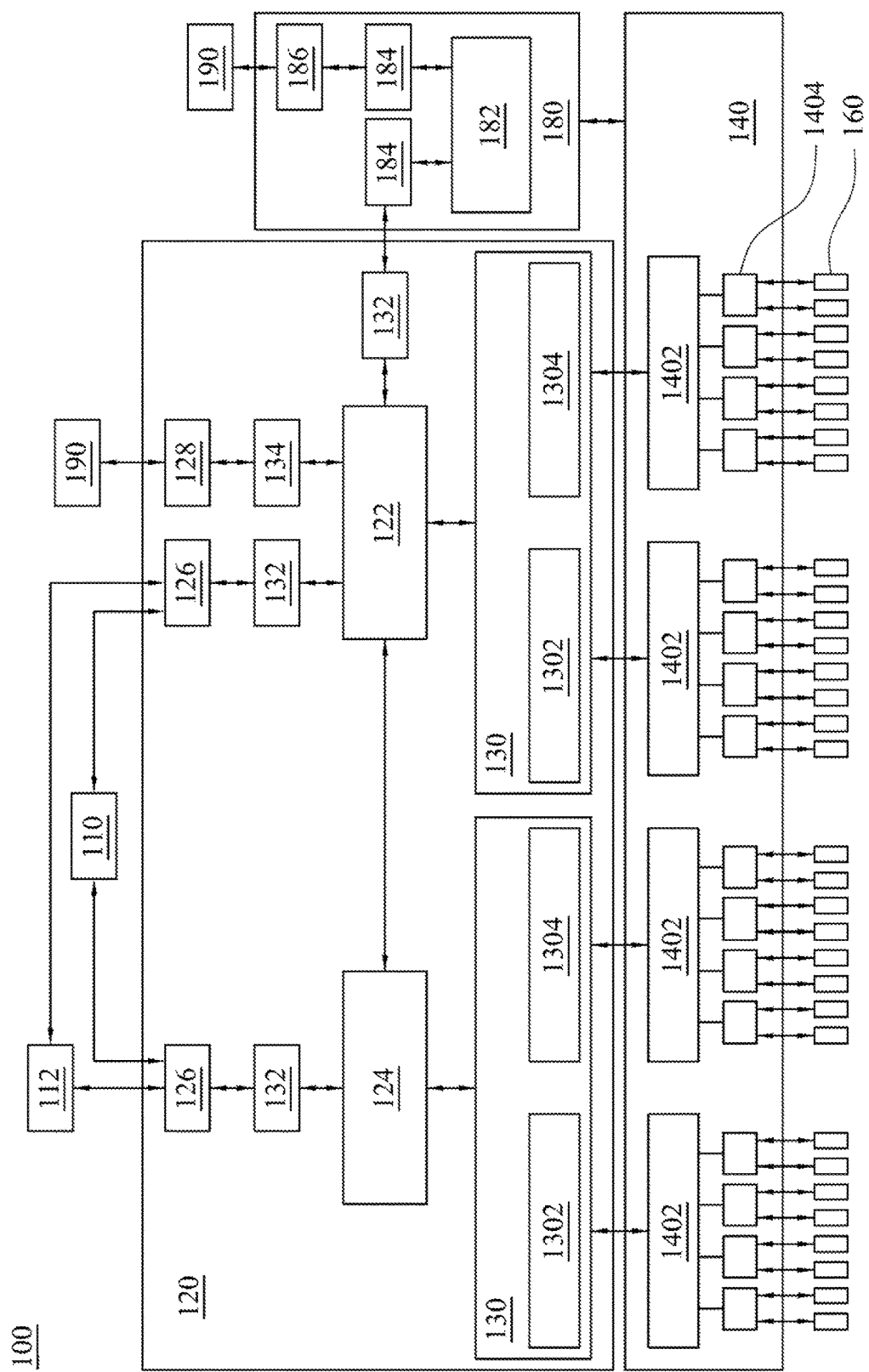
FIG. 1 is a structural schematic diagram of a video processing apparatus according to an embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

FIG. 1 illustrates a structural schematic diagram of a video processing apparatus 100 according to an embodiment of the present disclosure. A video processing apparatus 100 is connected to a request server 110 and a content server 112 through a working network. The video processing apparatus 100 includes a switch board 120, an adapter plate 140, video processing nodes 160 and a management board 180. The switch board 120 is connected to the request server 110 and the content server 112 through the working network. The switch board 120 includes a master switch 122 and a slave switch 124. The master switch 122 is electrically connected to the slave switch 124, and configured to synchronously receive and transmit video signals. In some embodiments, the master switch 122 is electrically connected to the slave switch 124 through the HiGig-Duo interface. The adapter plate 140 is electrically connected to the switch board 120. The adapter plate 140 includes automatic cluster management units 1402. The video processing nodes are electrically connected to the automatic cluster management units 1402. Video signals access the corresponding automatic cluster management unit 1402 through either the master switch 122 or the slave switch 124, and then video signals are assigned to the video processing node 160 to perform processing computation through the automatic cluster management unit 1402. In some embodiments, the management board 180 is connected to a management network. The management board 180 is electrically connected to the adapter plate 140, and the management board 180 monitors a system statue signal of the video processing nodes 160 through the adapter plate 140, so that a remote apparatus 190 can monitor a working statue of the video processing nodes 160 through the management network. In some embodiments, the management board 180 can be serially connected to the adapter plate 140 through the universal asynchronous receiver/transmitter (UART) interface or other suitable interface. While a client endpoint (not shown) sends a request through the working network, the request server 110 converts the request into a processing signal. The switch board 120 receives the processing signal through the working network, and then the switch board 120 assigns the processing signal to one of the video processing nodes 160 through either the master switch 122 or the slave switch 124. The video processing node 160 which receives the processing signal obtains video signals provided by the content server 112 through the adapter plate 140 and the switch board 120, and the video processing node 160 performs processing computation on the video signals, and then the video processing node 160 transmits the post-processed video signals to the client endpoint through the adapter plate 140 and the switch board 120.

As a consequence of aforesaid descriptions, the video signals which are synchronously received access different switches, such as the master switch 122 or the slave switch 124, through the switch board 120, after the video signals access the video processing apparatus 100. Then, the video signals access the corresponding automatic cluster management unit 1402 through either the master switch 122 or the slave switch 124, hence, the automatic cluster management unit 1402 would follow a configuration automatically transmitting the video signals to the appropriated video processing node 160, so that the video processing node 160 can perform computing and processing on the video signals. After that, the automatic cluster management unit 1402 receives the post-processed video signals from the corresponding video processing node 160, and transmits to the switch board 120. At the same time, while the video processing nodes 160 perform processing computation, the video processing apparatus 100 can monitor the system statue of every video processing nodes 160, for example, working temperature data or a working electrical consumption data of the video processing nodes 160. Then, the video processing apparatus 100 can adjust working statue of every video processing nodes 160 and the assignment of the video signals to the video processing node 160 under the cooperation of the switch board 120, the adapter plate 140 and the management board 180. Therefore, the video processing apparatus 100 can process multi-task synchronously under a high performance to watt ratio.

In some embodiments of the present disclosure, the adapter plate 140 further includes multi-route bi-directions switches 1404. Each of the automatic cluster management units 1402 is connected to the multi-route bi-directions switches 1404, that is, single automatic duster management unit 1402 is connected to multiple multi-route bi-directions switches 1404. The processing signal and the video signals are assigned to the corresponding video processing node 160 to perform processing computation through the automatic duster management unit 1402 and the multi-route bi-directions switch 1404. In some embodiments, each of the automatic cluster management units 1402 can be electrically connected to 6 multi-route bi-directions switches 1404 at most. Each of the multi-route bi-directions switches is connected to the video processing nodes 160, that is, single multi-route bi-directions switch 1404 is connected to multiple the video processing nodes 160. In some embodiments, the multi-route bi-directions switches 1404 can be a quad bi-direction receiving/transmitting switch. In some embodiments, each of multi-route bi-directions switches 1404 can be electrically connected to 4 video processing nodes 160 at most.

Therefore, after the video signals access the video processing apparatus 100, the video signals subsequently access different switches, such as the master switch 122 or the slave switch 124, through the switch board 120. Then, the video signals access the corresponding automatic cluster management unit 1402 through either the master switch 122 or the slave switch 124, hence, the automatic cluster management unit 1402 would assign the video signals separately to the corresponding multi-route bi-directions switch 1404. After that, the multi-route bi-directions switch 1404 assigns the video signals to the corresponding video processing node 160 to perform processing computation on the video signals. After that, the automatic cluster management unit 1402 receives the post-processed video signals from the corresponding video processing node 160, and transmits to the switch board 120. That is, after the switch board 120 of the video processing apparatus 100 is synchronously received the video signals, the video processing apparatus 100 can appropriately assign the video signals to the suitable video processing node 160 to perform computing and processing under the cooperation of the switch board 120 and the adapter plate 140, and the automatic cluster management units 1402 also function as receiving the post-processing video signals as demand from every video processing nodes 160 and transmit back to the switch board 120.

In some embodiments of the present disclosure, the switch board 120 further includes first network modules and second network module. The first network module includes a first network physical layer chip 132 and a first networking port 126. In some embodiments, the first network physical layer chips 132 are separately electrically connected to the first networking port 126 and one of the master switch 122 or the slave switch 124. The first networking port 126 is connected to the working network and configured to receive the processing signal from the request server, and to transmit the video signals. In some embodiment, a remote user sends a request to the request server 110, subsequently, the request server 110 transmits the processing signal to the switch board 120, and the processing signal is transmitted to the video processing node 160 through either the master switch 122 or the slave switch 124. In some embodiments, the first network physical layer chips 132 can be a BCM54210 chip. In some embodiments, the first networking port 126 can be a MDI interface or other suitable networking port. In some embodiments, the second network module includes a second network physical layer chip 134 and a second networking port 128. In some embodiment, the second network physical layer chip 134 is electrically connected to the master switch 122 and a debug network separately, to transmit a debug signal. Furthermore, the second networking port 128 is connected to the debug network, the second network physical layer chip 134 is electrically connected to the second networking port 128 and the master switch 122 separately. In some embodiments, the second network physical layer chip 134 can be a BCM5221 chip. In some embodiments, the second networking port 128 can be a RJ45 interface and other suitable networking interface. In some embodiments, the remote apparatus 190 can drive a joint test action group (JTAG) to perform debugging on the video processing apparatus 100 through the second networking port 128, and the debug signal can also be transmitted through the second networking port 128.

In some embodiments of the present disclosure, the first network module receives the processing signal from the request server 110, and transmits to the video processing node 160 through one of the master switch 122 or the slave switch 124, subsequently, the video processing node 160 obtains the assigned video signals through the switch board 120. In some embodiments, the video processing node 160 requests the content server 112 for the assigned video signals through the switch board 120, and the assigned video signals are transmitted to the corresponding video processing node 160 through the aforesaid automatic cluster management units 1402, the processing computation on the video signals would be described in detail later.

In some embodiments of the present disclosure, the switch board 120 further includes network access units 130. The network access units 130 connect the master switch 122 and the slave switch 124 to the corresponding automatic cluster management units 1402. In some embodiments, the network access units 130 electrically connect to the automatic cluster management units 1402 through cable or other suitable electric connection. In some embodiments, the network access unit 130 includes a third network physical layer chip 1302 and conductive wires 1304. In some embodiment, the third network physical layer chip 1302 can be a component of network physical layer or data link layer in open system interconnection (OSI) model. In some embodiments, the master switch 122 and the slave switch 124 are connected to the third network physical layer chip 1302 through a QSGMII interface or other suitable media independent interface. In some embodiments, the master switch 122 and the slave switch 124 with the network access units 130 are capable to be separately connected to the automatic cluster management units 1402 in two different way, to deal with the transmission of the video signals in various format.

In some embodiment of the present disclosure the management board 180 is electrically connected to the adapter board 140 and the master switch 122. In some embodiments, the management board 180 can be electrically connected to the master switch 122 through the network interface controller (NIC) or other suitable interface. In some embodiments, the management board 180 includes a board management controller 182 and third network modules. The third network module includes a second network physical layer chip 184 and a third networking port 186. In some embodiments, the second network physical layer chip 134 and the second network physical layer chip 184 can both be a data link layer chip in OSI model, in which the second network physical layer chip 134 can be BCM54210 chip, and the second network physical layer chip 184 can be BCM5221 chip. In some embodiments, the board management controller 182 is electrically connected to the adapter plate 140 and the third network modules. In some embodiments, the board management controller 182 can be BMC AST1050 chip. In some embodiments, one of the second network physical layer chip 184 is connected to one of the first network physical layer chip 132 of the switch board 120 through the network interface controller. The board management controller 182 has an apparatus management configuration, to adjust the system statue of the video processing apparatus 100. The third networking port 186 is electrically connected to the management network and the management board 180. Furthermore, the third networking port 186 is electrically connected to the board management controller 182 through one of the second network physical layer chip 184, and the remote apparatus 190 or the master switch 122 can be connected to the board management controller 182 to transmit a management signal through the third network module, to adjust the apparatus management configuration of the management board 180 through the management signal.

Figure 2:
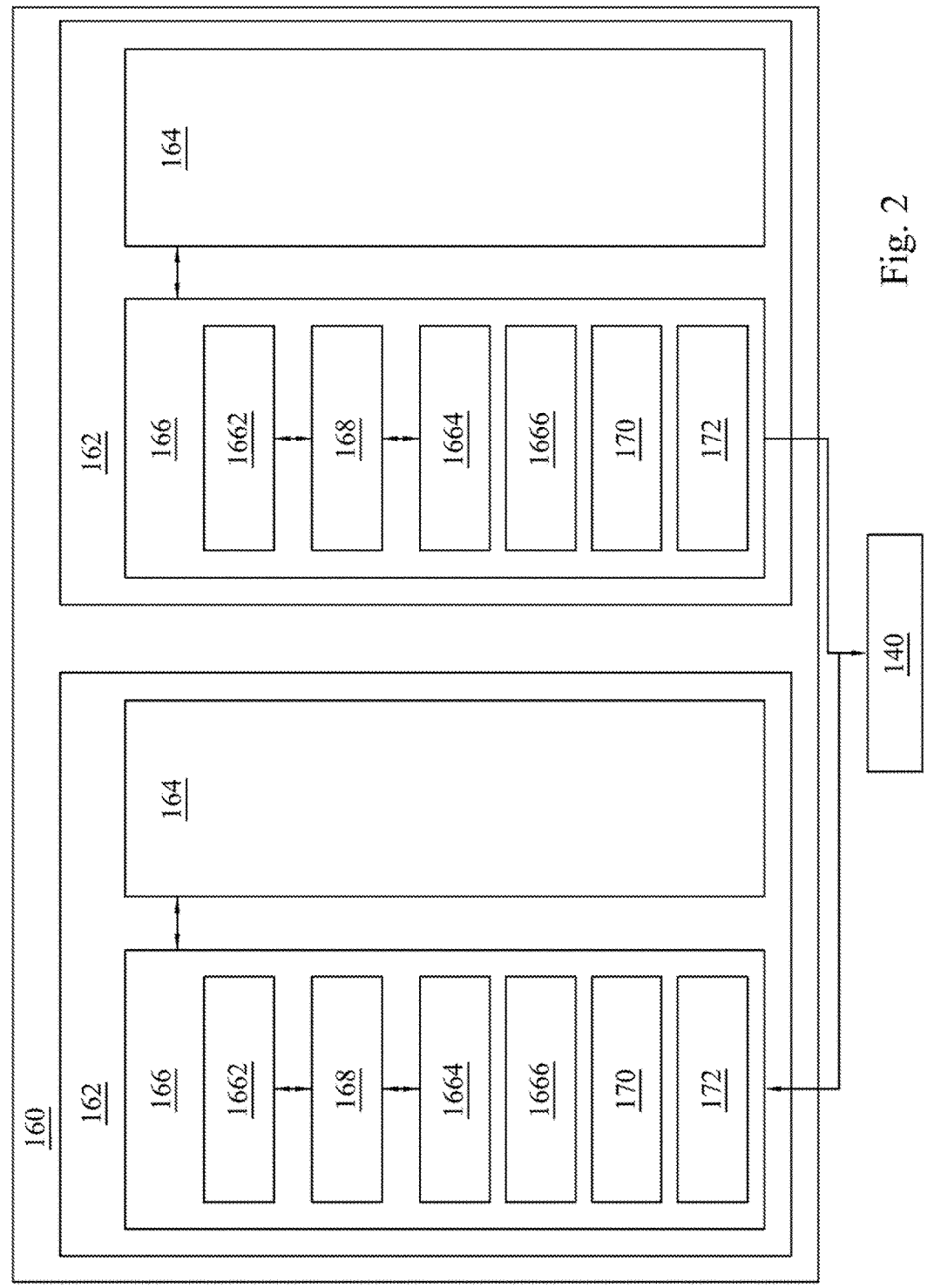
FIG. 2 is a structural schematic diagram of a video processing node according to an embodiment of the present disclosure.

FIG. 2 illustrates a structural schematic diagram of a video processing node 160 according to an embodiment of the present disclosure. In some embodiments of the present disclosure, the video processing node 160 includes two video processing modules 162. Each of the video processing modules includes a video processing unit 164 and a peripheral unit 166. The video processing unit 164 is configured to process the video signal assigned to the video processing unit 164. The peripheral unit 166 is electrically connected to the video processing unit 164, and also electrically connected to the switch board 120 and the management board 180 through the adapter plate 140 (as shown in FIG. 1). The peripheral unit 166 transmits the system statue signal to the management board 180, and the peripheral unit 166 receives the video signals from the switch board 120, hence, the peripheral unit 166 also transmits the post processing video signals to the switch board 120. In some embodiments, after the switch board 120 receives the post processing video signals, subsequently, the switch board 120 sends the post processing video signals to the corresponding client endpoint through the first networking port 126.

Summarized from the above, the client endpoint sends a processing signal to switch board 120 through the request server 110. The switch board 120 transmits the processing signal to the video processing node 160, subsequently, the video processing node 160 obtains the video signals from the content server 112 through the switch board 120. After, the video signals obtaining form the content server 112 access the switch board 120, the video signals are assigned to the corresponding video processing node 160 through the automatic cluster management unit 1402. The video processing node 160 transmits the video signals to one of the two video processing modules 162 to perform processing. After the video processing module 162 performs processing on the video signals, and coverts the video signals in to the post processing video signals, subsequently, the post processing video signals is transmitted back to the switch board 120. Then, the switch board 120 sends the post processing video signals to the client endpoint. Therefore, a processing process of the apparatus 100 dealing with a request of video signals from a user has been fully described.

In some embodiments of the present disclosure, the peripheral unit 166 includes a temperature sensor 1662 and an electrical consumption sensor 1664. The temperature sensor 1662 is configured to transmit a working temperature data of the corresponding video processing module 162 to the management board 180. The electrical consumption sensor 1664 is configured to transmit a working electrical consumption data of the corresponding video processing module 162 to the management board 180. The system statue signal includes the working temperature data and the working electrical consumption data. In some embodiments, the video processing node 160 further includes connection ports 1666. The connection ports 1666 is configured to connect the corresponding video processing module 162 to a display (not shown), so that an user can monitor the image of the video signals instantaneously.

In some embodiments, the peripheral unit 166 further includes a power supply interface 170, a video signal transmitting interface 172 and a system statue transmitting interface 168, electrically connected to the video processing unit 164 separately. In some embodiments, the system statue transmitting interface 168 is electrically connected to the temperature sensor 1662 and the electrical consumption sensor 1664, and the temperature sensor 1662 and the electrical consumption sensor 1664 transmit the system statue signal through the system statue transmitting interface 168. In some embodiments, the system statue transmitting interface 168 can be a inter-integrated circuit (I2C) interface or other suitable transmitting interface. In some embodiments, the system statue transmitting interface 168 further includes hot plugging protection circuit (not shown), configured to avoid the video processing module 162 being damaged by the electric current while the video processing module 162 is hot swapping or hot plugging. In some embodiments, the video processing node 160 further includes a golden finger (not shown), configured to be inserted to the adapter plate 140. The golden finger has pins, and the pins are correspondingly electrically connected to the power supply interface 170, the video signal transmitting interface 172 and the system statue transmitting interface 168 separately. In some embodiments, the peripheral unit 166 further includes peripheral units, such as a system updating interface and memory . . . etc.

Figure 3:
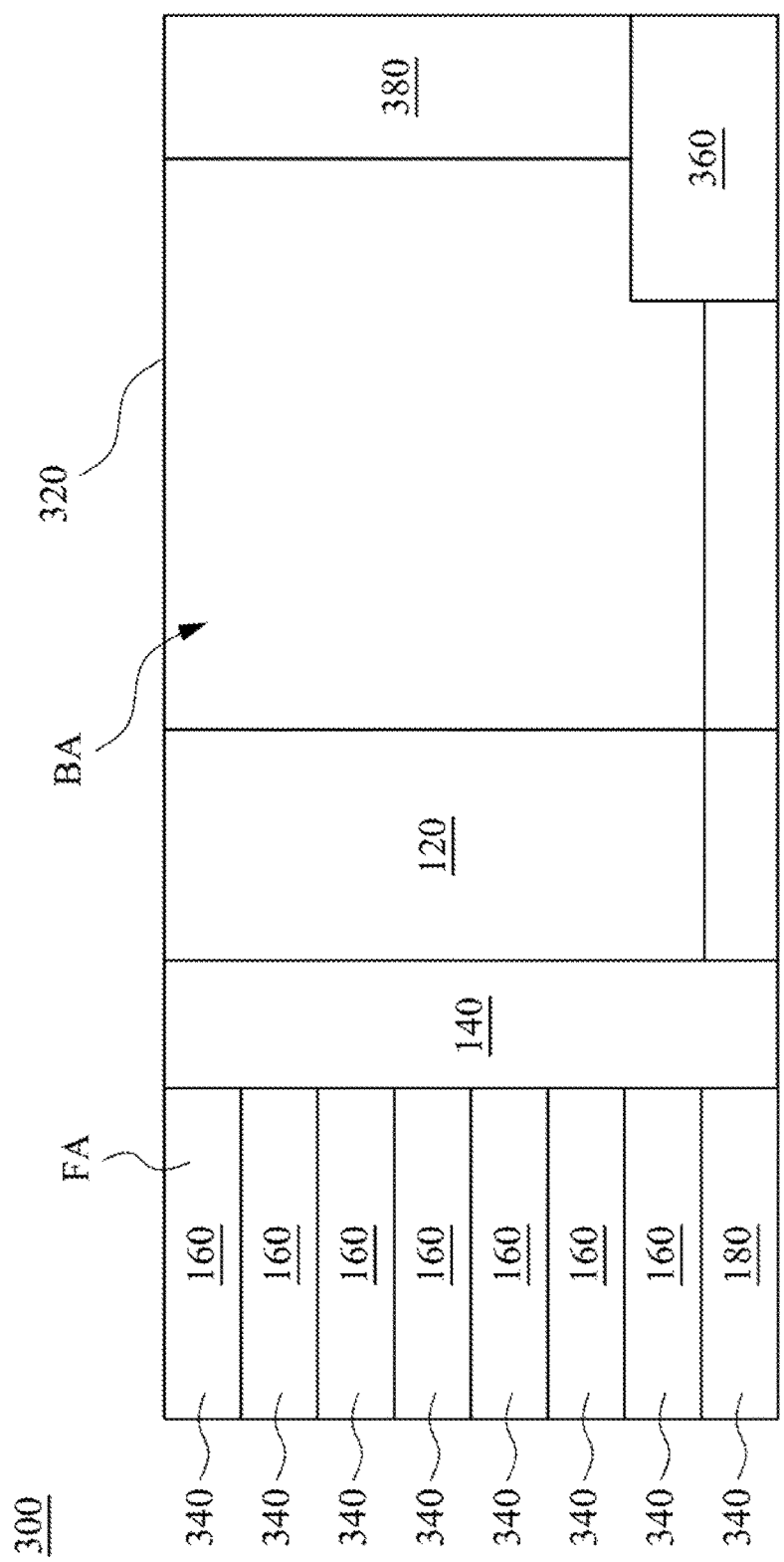
FIG. 3 is a top view of a video processing apparatus according to an embodiment of the present disclosure.

FIG. 3 is a top view of a video processing apparatus 300 according to an embodiment of the present disclosure. In some embodiments of the present disclosure, the video processing apparatus 300 further includes a housing 320. The housing 320 has an accommodation space. The accommodation space is divided into a front accommodation space FA and a backside accommodation space BA by the adapter plate 140, opposite to each other. The switch board 120 is located in the backside accommodation space BA. The management board 180 and the video processing nodes 160 are located inside the front accommodation space FA. In some embodiments, the front accommodation space FA has accommodation slots, and the video processing nodes 160 and the management board 180 are disposed inside the accommodation slots. In some embodiments, the video processing apparatus 300 further includes a power supply module 360 and fans module 380.

Summarized from the above, the present disclosure provided a video processing apparatus, connected to a request server and a content server through a working network. While a client endpoint sends a request through the working network, the request server converts the request into a processing signal. The switch board receives the processing signal through the working network, and then the switch board assigns the processing signal to one of the video processing nodes through either the master switch or the slave switch. The video processing node which receives the processing signal obtains video signals from the content server through the adapter plate and the switch board. After, the video processing node performs processing computation on the video signals, and then the video processing node transmits the post-processing video signals to the client endpoint through the adapter plate and the switch board. At the same time, a remote device can monitor a system statue of every video processing nodes through a management network or a predetermined configuration in management board, and adjust working statue of every video processing nodes under the cooperation of the switch board and the management board.

Although some embodiments of the present disclosure and their advantages have been described in detail, it should be understood that various changes, substitutions, and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, fabricate, composition of matter, means, methods, and steps described in the specification. As one of ordinary skill in the art will readily appreciate from the disclosure of the present disclosure, processes, machines, fabricate, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, fabricate, compositions of matter, means, methods, or steps.

What is claimed is:

1. A video processing apparatus, configured to be connected to at least one request server and at least one content server through a working network, the video processing apparatus comprising:
   a switch board connected to the request server and the content server through the working network, the switch board comprising a master switch and a slave switch, the master switch being electrically connected to the slave switch;
   an adapter plate electrically-connected to the switch board, the adapter plate comprising a plurality of automatic cluster management units;
   a plurality of video processing nodes electrically connected to the automatic cluster management units; and
   a management board connected to a management network, the management board being electrically connected to the adapter plate and monitoring a system statue signal of the video processing nodes through the adapter plate, the management board being configured to provide a remote apparatus monitoring a working statue of the video processing nodes through the management network,
   wherein when a client endpoint sends a request through the working network, the request server converts the request into a processing signal, then the switch board receives the processing signal through the working network and assigns the processing signal to one of the video processing nodes through either the master switch or the slave switch, the video processing node which receives the processing signal obtains a plurality of video signals provided by the content server through the adapter plate and the switch board, and the video processing node performs processing computation on the video signals, and then transmits the processed video signals to the client endpoint through the adapter plate and the switch board.

2. The video processing apparatus of claim 1, wherein the adapter plate further comprises a plurality of multi-route bi-directions switches, each of the automatic cluster management units is connected to the multi-route bi-directions switches, each of the multi-route bi-directions switches is connected to the video processing nodes, the processing signal and the video signals are assigned to the corresponding video processing nodes to perform processing computation through the automatic cluster management units and the multi-route bi-directions switches.

3. The video processing apparatus of claim 1, wherein the switch board further comprises:
   a plurality of first network modules, each of the first network modules being connected to either the master switch or the slave switch, and the first network modules being connected to the working network; and
   a second network module connected to the master switch and a debug network, to transmit a debug signal.

4. The video processing apparatus of claim 3, wherein each of the first network modules comprises a first network physical layer chip and a first networking port, the first networking port is configured to be connected to the working network, to receive the processing signal from the request server, and to transmit the processing signal to one of the video processing nodes through either the master switch or the slave switch.

5. The video processing apparatus of claim 4, wherein each of the video processing nodes comprises two video processing modules, and each of the video processing modules comprises:
   a peripheral unit electrically connected to the switch board and the management board through the adapter plate, and the peripheral unit transmitting the system statue signal to the management board and receiving the video signals from the switch board.

6. The video processing apparatus of claim 5, wherein the peripheral unit comprises:
   a temperature sensor configured to transmit a working temperature data of the corresponding video processing module to the management board; and an electrical consumption sensor configured to transmit a working electrical consumption data of the corresponding video processing module to the management board, wherein the system statue signal comprises the working temperature data and the working electrical consumption data.

7. The video processing apparatus of claim 4, wherein the second network module comprises:
  a second networking port connected to the debug network; and
  a second network physical layer chip connected to the master switch and the second networking port, the second network physical layer chip being configured to transmit the debug signal received from the second networking port to the master switch, to perform debugging to the video processing apparatus.

8. The video processing apparatus of claim 3, wherein the management board comprises a board management controller and a plurality of third network modules, the board management controller is electrically connected to the adapter plate and the third network modules, one of the third network modules is electrically connected to one of the first network modules of the switch board, one of the third network modules comprises a third networking port connected to the management network and the management board, and the remote apparatus transmits a management signal to the management board through the third networking port.

9. The video processing apparatus of claim 1, wherein the switch board further comprises a plurality of network access units, the network access units connect the master switch and the slave switch to the corresponding automatic cluster management units.

10. The video processing apparatus of claim 9, wherein each of the network access units comprises a third network physical layer chip and a plurality of conductive wires.

11. The video processing apparatus of claim 1, further comprising: a housing having an accommodation space, the accommodation space being divided into a front accommodation space and a backside accommodation space by the adapter plate opposite to each other, wherein the switch board is located in the backside accommodation space, the front accommodation space has a plurality of accommodation slots, and the video processing nodes and the management board are disposed inside the accommodation slots.

* * * * *